July 23, 1929.  H. A. HUSTED  1,721,664
METHOD OF MAKING FLANGED METAL SPIDERS
Filed May 12, 1928    5 Sheets-Sheet 1

INVENTOR
Harry A Husted
BY Evans & McCoy
ATTORNEY

July 23, 1929.  H. A. HUSTED  1,721,664
METHOD OF MAKING FLANGED METAL SPIDERS
Filed May 12, 1928   5 Sheets-Sheet 2

INVENTOR
Harry A Husted
BY
Evans & McCoy
ATTORNEY

July 23, 1929.  H. A. HUSTED  1,721,664
METHOD OF MAKING FLANGED METAL SPIDERS
Filed May 12, 1928   5 Sheets-Sheet 3
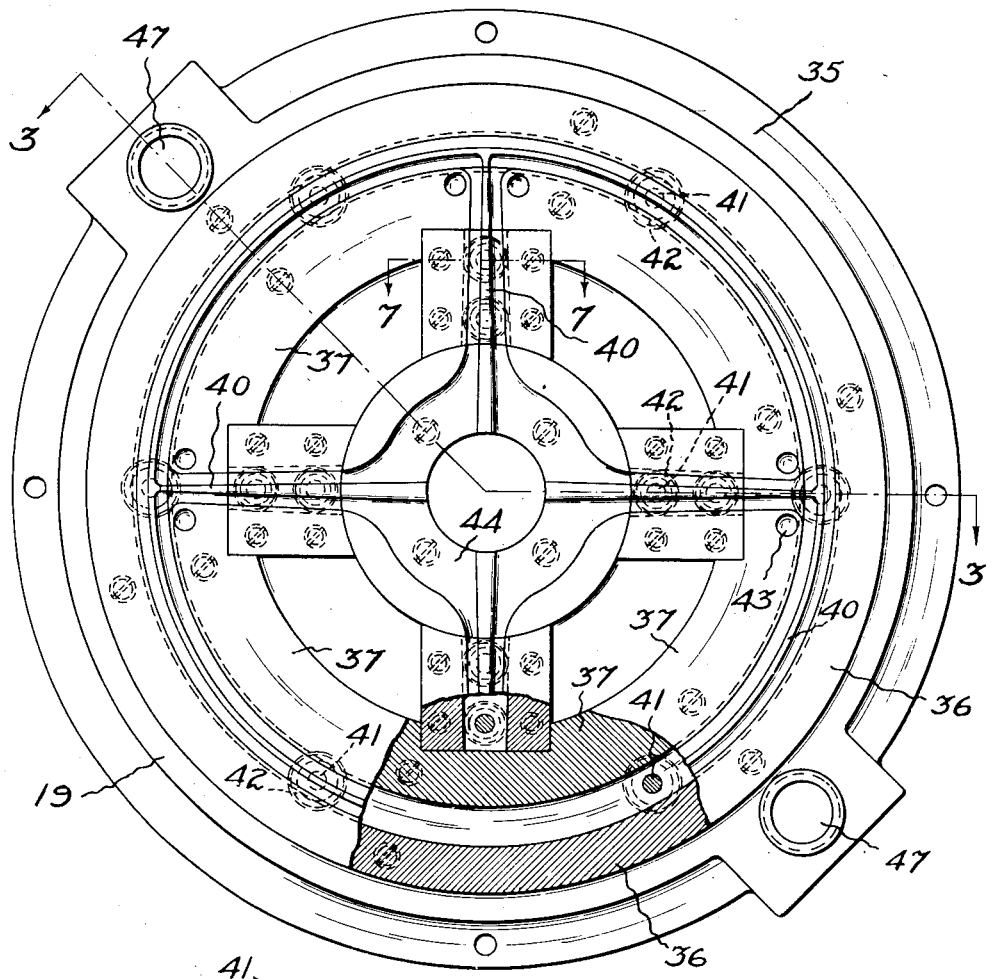
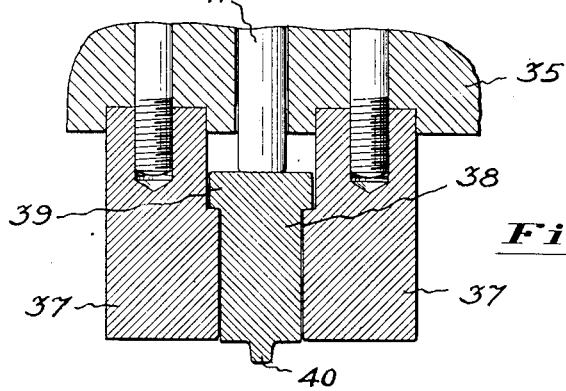
Fig.6.
Fig.7.
INVENTOR
Harry A Husted
BY
Evans & McCoy
ATTORNEY July 23, 1929.  H. A. HUSTED  1,721,664
METHOD OF MAKING FLANGED METAL SPIDERS
Filed May 12, 1928  5 Sheets-Sheet 5
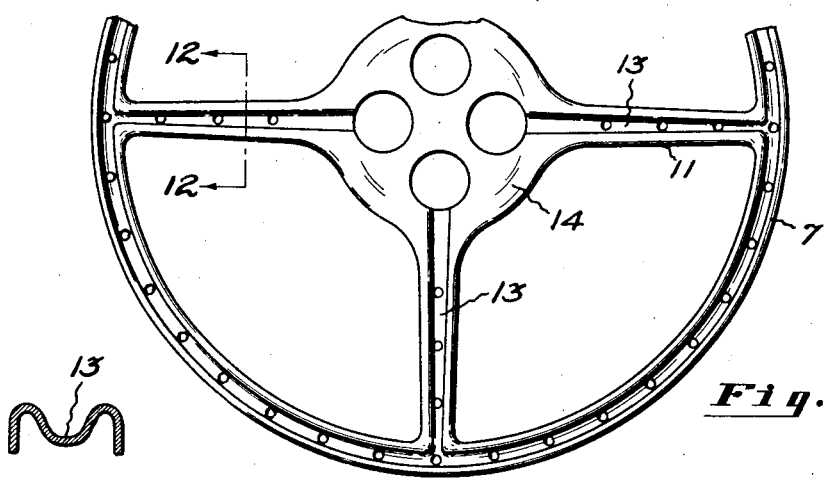
Fig. 11.
Fig. 12.
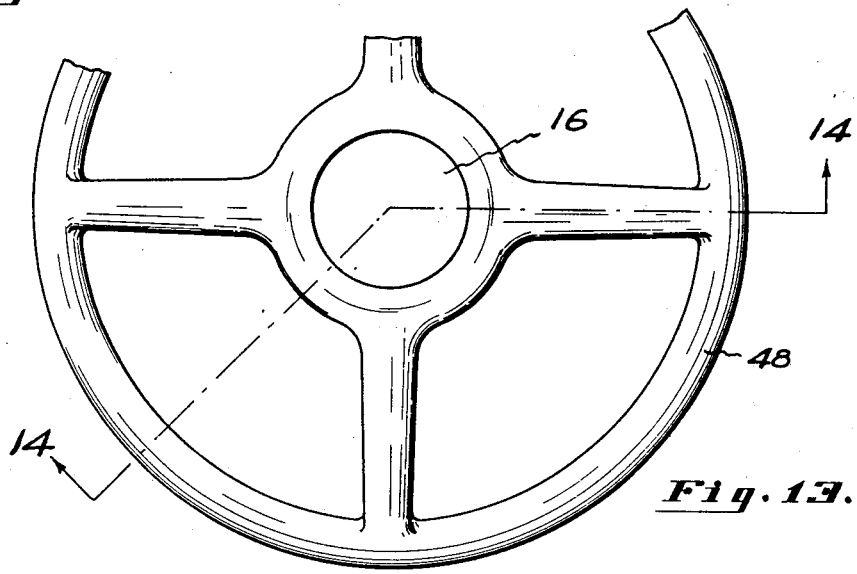
Fig. 13.
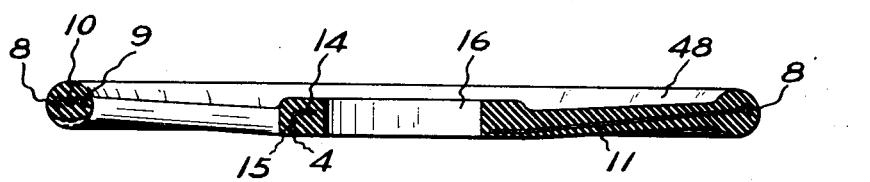
Fig. 14.
INVENTOR
Harry A Husted
BY Evans & McCoy
ATTORNEY Patented July 23, 1929.

1,721,664

UNITED STATES PATENT OFFICE.

HARRY A. HUSTED, OF DETROIT, MICHIGAN.

METHOD OF MAKING FLANGED METAL SPIDERS.

Application filed May 12, 1928. Serial No. 277,138.

This invention relates to a method of and apparatus for making flanged metal spiders and more particularly to a method of making one piece spiders of dished form suitable for reinforcing composition steering wheels of the type disclosed in my copending application Serial No. 167,387 filed January 14, 1927.

The present invention has for its object to provide a method of making a dished one piece spider strengthened throughout by continuous ribs or flanges by which a spider is produced without distortion of the rim out of round and without lateral distortion of any part of the spider due to the redistribution or flowing of metal in the forming operation.

A further object is to provide a method of making a flanged spider with a relatively narrow annular hub portion having a relatively large central opening without distorting the hub portion in the forming operation.

A further object of the invention is to provide apparatus by means of which spiders may be expeditiously formed in accordance with the method of the present invention.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

Reference should be had to the accompanying drawing forming a part of the specification in which:

Fig. 6 is a bottom plan view of the upper movable die viewed as indicated at 6—6 in Fig. 3.

Fig. 7 is a fragmentary section taken on the line indicated at 7—7 in Fig. 6.

Fig. 11 is a fragmentary plan view showing the completed spider.

Fig. 12 is a transverse section through one of the spokes of the spider taken on the line indicated at 12—12 in Fig. 11.

Fig. 13 is a fragmentary plan view of the reinforced composition steering wheel.

Fig. 14 is a section taken on the line indicated at 14—14 in Fig. 13.

Figure 1:
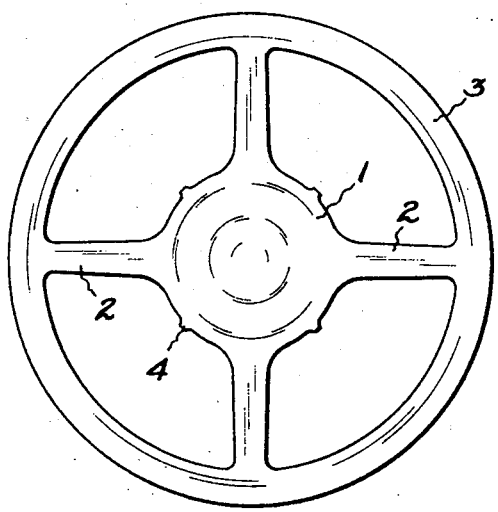
Figure 1 is a plan view of the flat wheel shaped blank from which the spider is formed.
Figure 2:
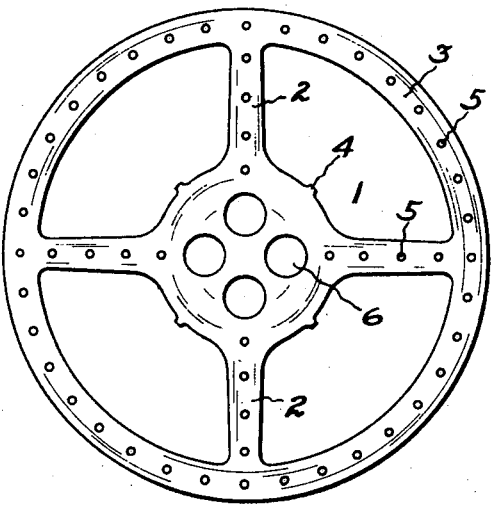
Fig. 2 is a plan view of the blank after the rim and spoke apertures and hub opening have been punched therein.
Figure 3:
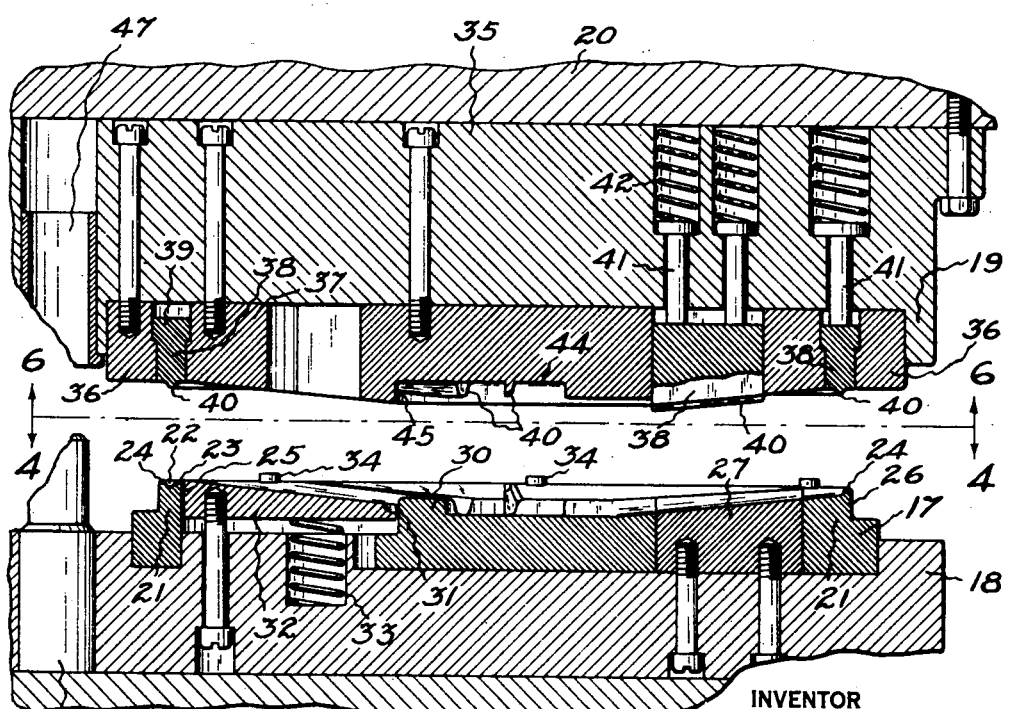
Fig. 3 is a vertical section through the dies between which the spider is formed, the section being taken on the line indicated at 3—3 in Figs. 4 and 6.
Figure 4:
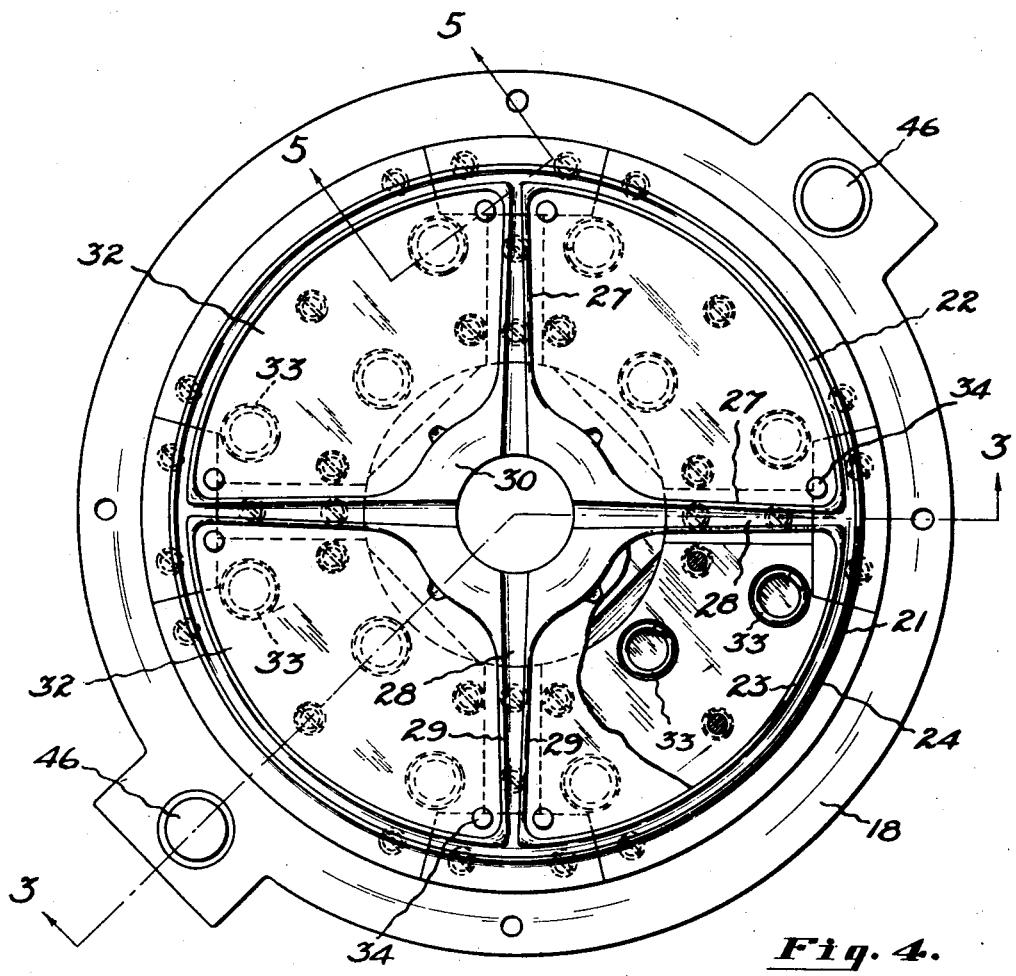
Fig. 4 is a top plan view of the bottom or stationary die viewed as indicated at 4—4 in Fig. 3.
Figure 5:
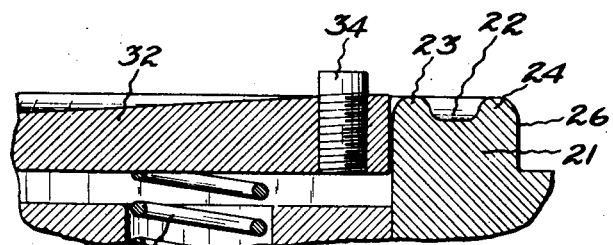
Fig. 5 is a fragmentary section taken on the line indicated at 5—5 in Fig. 4.
Figure 8:
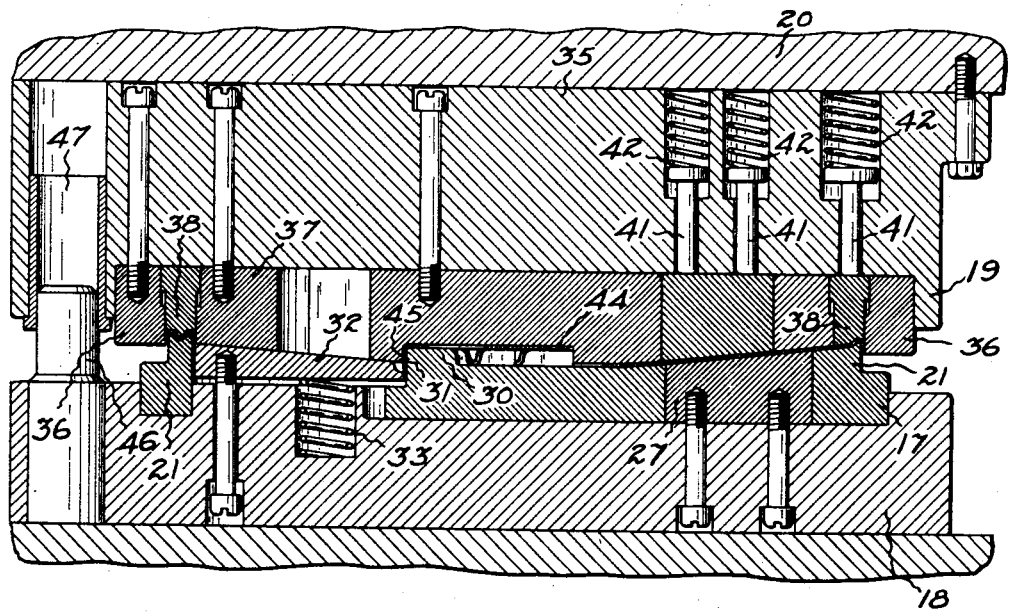
Fig. 8 is a fragmentary section through the upper die showing the upper die in full engagement with the lower die.
Figure 9:
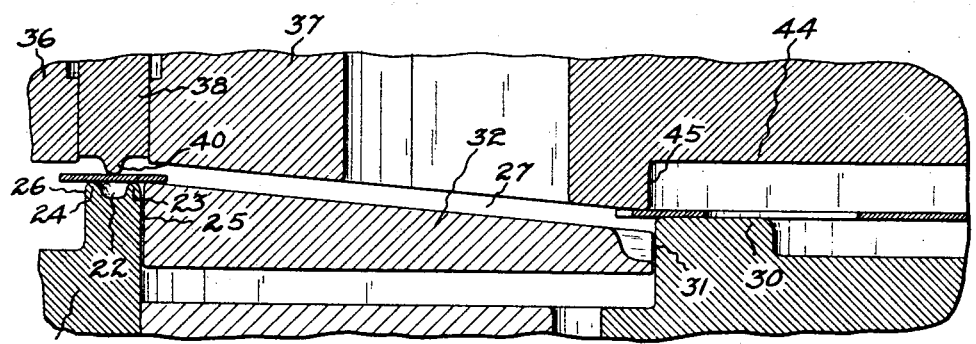
Fig. 9 is a fragmentary section showing the position of the dies with respect to the blank at the beginning of the flanging operation.

Referring to the accompanying drawings, the blank from which the spider is made is shown in Figs. 1 and 2 of the drawing. This blank is a flat one piece blank of wheel form cut from a flat metal plate and having a central hub portion 1, spoke portions 2 radiating from the hub portion and a continuous rim portion 3. The spokes 2 are preferably placed equi-angularly about the central hub portion and the hub portion of the blank between the spokes may be provided with short projections 4 for a purpose which will be hereinafter explained. As shown in Fig. 2 of the drawing, rows of small perforations are formed in the blank centrally along the rim and spoke portions, these small perforations being for the purpose of integrally uniting the composition body of the steering wheel in which the spider is embedded through the spider.

The finished spider has a relatively large central opening, but in order to avoid distortion of the hub portion during the forming operation, this opening is not formed in the blank prior to the stamping operation. But, in order to permit the metal in the hub portion to be formed without setting up internal stresses which would tend to cause distortion, a series of openings 6 are formed around the center of the hub portion within the periphery of the opening to be cut in the finished spider to lighten the hub portion without weakening it sufficiently to allow distortion during the forming operation.

As shown in Figs. 11 to 14, the completed spider has a continuous rim 7 having a continuous outer flange 8, inner flanges 9 along the inner edge thereof and a continuous corrugation 10 in the web thereof projecting in the same direction as the side flanges 8 and 9. The spokes 11 of the spider have side flanges 12 and longitudinal corrugations 13 formed in the webs thereof. The hub 14 of the spider has an outer flange 15 and a central opening 16 formed by cutting away the central portion containing the openings 6. The flanges of the rim, spokes and hub all extend laterally of the spider in the same direction, the flanges 12 of the spokes being continuous with the inner flanges 9 of the rim and with the flanges 15 of the hub. The corrugations 13 of the spokes merge into the corrugation 10 of the rim and extend through the hub portion to the central opening 16. The spider is thus uniformly strengthened throughout by the continuous flanges and corrugations. As shown in Fig. 14, the reinforcing spider is of dished form, the hub portion 14 being offset laterally with respect to the plane of the rim portion and the spokes 11 being inclined from the rim portion to the spoke portion.

The present invention provides a method by which the reinforcing spider shown in Figs. 11 to 13 may be formed from the flat metal blank shown in Figs. 1 and 2 without distortion of any part thereof, the rim portion 3 being held against distortion of any part thereof out of the plane of the rim and the hub and rim being accurately formed and centered with respect to the axis of the spider.

In forming the spider from the flat metal blank, the blank is placed between a pair of dies which conform to opposite side faces of the spider and these dies are so constructed and operated that prior to the flanging of the blank, the blank is pressed to dish form. During the dishing of the blank, the rim portion of the blank is positively held to its original diameter so that the lateral movement of the hub portion of the blank with respect to the rim portion thereof causes the spoke portions of the blank to be stretched slightly to permit the lateral offsetting of the hub portion with respect to rim portion while the rim portion remains at its original diameter. After the dishing of the blank, the dies are brought into full engagement simultaneously flanging and corrugating the hub, spoke and rim portions of the spider. Distortion of the hub portion of the spider during the dishing and flanging operations is prevented by reason of the openings 6 formed in the hub which reduce the rigidity of the hub portion sufficiently to permit the hub portion to be readily pressed to its final shape without setting up excessive internal stresses, but which also leave integral web portions across the center of the hub portion of the blank, which hold the peripheral portions of the hub between the spokes against distortion during the forming operation.

Dies suitable for forming a flanged spider from a flat blank in accordance with the method of the present invention are shown in Figs. 3 to 10 of the drawing, these dies comprising a lower stationary die 17 fixed to the bed 18 of a suitable press and a movable upper die 19 secured to the movable head 20 of the press.

The lower die 17 has a peripheral rim engaging portion in the form of a fixed annular upwardly projecting rib 21 which has a continuous corrugation forming groove 22 in its upper edge which provides inner and outer annular ribs 23 and 24 along the upper edge of the rib 21. The rib 21 fits within the channel of the rim 7 of the spider and has vertical inner and outer walls 25 and 26 against which the side flanges 8 and 9 of the rim are formed. The bottom die also has stationary radial spoke engaging ribs 27 which slope downwardly from the rim engaging rib 21 toward the center of the die and which are provided along their upper edges with corrugation forming channels 28 and side ribs 29, the ribs 27 being formed to fit within the channels of the spokes of the spider. The stationary die is also provided with a raised hub forming portion 30 which is disposed at a lower level than the peripheral rim engaging rib 21 of the die. The hub forming portion 30 of the lower die has a top surface which conforms to the bottom surface of the hub of the spider and has vertical peripheral wall portions 31 between the spokes against which the outer flanges 15 of the spider are formed. In the spaces of the die between the spoke forming ribs 27 and between the rim forming rib 21 and hub forming portion 30, the bottom die is provided with segmental cushion plates 32 which are supported upon compression coil springs 33. The upper faces of the plates 32 are inclined downwardly from adjacent the rim engaging rib 21 to the hub portion 31 and are normally supported by the springs 33 with their outer edges substantially flush with the top of the rib 21 and with their side edges flush with the tops of the spoke forming ribs 27. The cushion plates 32 carry upwardly projecting positioning studs 34 on opposite sides of each of the spoke engaging ribs 21 and adjacent the outer edges of the plates. These positioning studs are so located that when the flat blank is placed on the lower die, the studs engage the opposite edges of the spoke portions of the blank adjacent the rim and also engage the inner edge of the rim portion to prevent the rim portion from being drawn inwardly during the initial portion of the compression stroke, while the hub portion of the blank is being forced downwardly into engagement with the hub forming portion 30 of the die. The annular rim forming rib 21, the radial spoke forming ribs 27 and the hub forming portion 30 of the bottom die form a wheel shaped concave die conforming to the under face of the spider throughout and upon which the spider is formed by the action of the upper movable die.

The upper die 19 consists of a bed plate 35 rigidly secured to the movable head 20 and this bed plate has rigidly attached thereto an outer annular flanging die 36 which projects downwardly from the plate and has an internal diameter slightly greater than the external diameter of the annular rib 21 of the lower die to accommodate the outer flange of the spider between its inner face and the outer face of the rib 21. Also, rigidly secured to the bed plate 35 within the annular flanging die 36 are segmental flanging dies 37 which have a shape corresponding to the shape of the openings between the spokes of the completed spider, the flanging dies 37 being spaced inwardly from the outer flanging die 36 a distance corresponding to the width of the rim of the spider to accommodate the rib 21 and the flanges of the rim of the spider between them and being spaced from each other a distance corresponding to the width of the spider to accommodate the spoke forming ribs 27 and the flanges of the spokes of the spider between them. In the downward movement of the upper die, the outer annular flanging die 36 engages the outer edge of the rim portion of the blank and bends the same down against the outer face 26 of the rib 21 of the lower die and the segmental dies 37 engage the inner edge of the rim portion of the blank, the outer edge of the hub portion and the side edges of the spoke portions thereof bending the inner edge of the rim portion against the inner face 25 of the rib 21, the outer edge of the hub portion against the outer face 31 of the hub forming portion 30 of the lower die and opposite side edges of the spoke portions against the opposite side faces of the spoke forming ribs 27 of the lower die. Mounted in the spaces between the segmental flanging dies 37 and outer annular flanging dies 36 and in the spaces between adjacent segmental dies 37, there is a corrugating die 38 in the form of a spider which has an enlarged upper portion engageable with oppositely disposed shoulders on the flanging dies 36 and 37 to limit the downward movement thereof. The corrugating die 38 is provided along the lower edges thereof with ribs 40 which are positioned to enter the grooves 22 and 28 of the ribs 21 and 27 of the lower die to form the circumferential corrugation in the rim and the radial corrugations in the spokes. The spider 38 may be formed in one piece or the rim and spoke engaging portions may be formed separately. In either case, the corrugating spider is guided by vertical stems 41 slidably in bed plate 41 and is normally held in its lowermost position with the enlarged portion 39 thereof engaging the shoulders of the flanging dies by means of compression coil springs 42 acting upon the guide stems 41. The upper die 19 is provided with apertures 43 to receive the positioning studs 34 of the lower die so that the cushioning plates 32 are maintained in engagement with the blank during the initial engagement of the upper die with the blank to force the hub portion of the blank down into engagement with the hub forming portion 30. The upper die has a hub forming portion 44 which is lower than the outer flanging die 36 and the spoke engaging portions of the upper die are inclined downwardly toward the center of the die. The hub forming portion 44 is recessed to receive the hub portion of the finished spider and the inner portions of the spokes of the spider, being provided with flanging portions 45 which cooperate with the hub forming portion 30 of the lower die to bend the outer edge portions of the hub into engagement with the outer face 31 of the hub forming portion 30. The upper die is maintained in proper alinement with the lower die during the forming operation by means of guide pins 46 fixed to the bed and slidably fitting into sockets 47 carried by the bed plate 35 of the upper die.

Figure 10:
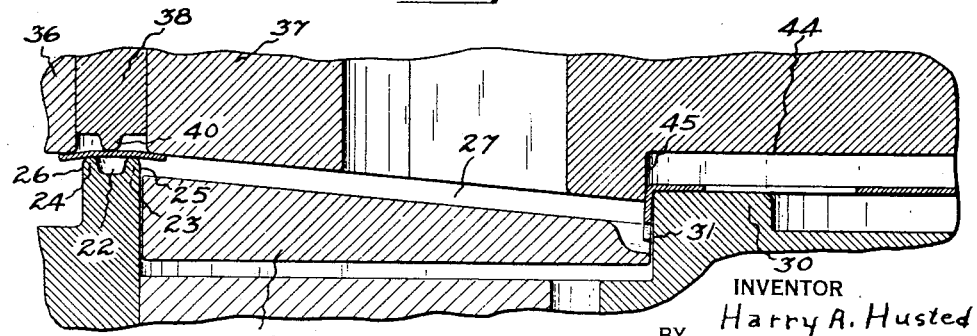
Fig. 10 is a sectional view similar to Fig. 9, showing a position of the dies with respect to the blank during the flange forming portion of the stroke.

In the operation of the machine, a flat flank such as shown in Fig. 2 is placed on the lower die with its rim portion 3 resting upon the top of the annular rib 21 and with the outer ends of the spoke portions lying between positioning studs 34 on the cushioning plates 32. As the upper die is brought down into engagement with the blank, the central hub flanging portion of the upper die first engages the hub portion of the blank and forces the hub portion down into engagement with the hub forming portion 30 of the lower die. This lateral displacement of the hub portion of the blank with respect to the rim portion would normally draw the rim portion of the blank inwardly at the ends of the spokes and distort the rim portion, but this is prevented by the positioning studs 34 which positively hold the rim portion 3 of the blank against inward movement so that the spoke portions of the blanks are stretched slightly, as the blank is pressed into dished form. When the hub portion of the blank has been brought to a position against the uper surface of the hub forming portion 30 of the lower die, the corrugating ribs 40 of the upper die will be in engagement with the rim portion of the blank throughout its periphery and with the spoke portions thereof throughout their length and the inner edge portion of the rim, the outer edge of the hub portion and side edges of the spoke portions being clamped between the flanging dies 37 and cushion plates 32. Continued movement of the upper die causes the corrugating die 38 to be moved upwardly with respect to the flanging dies against the pressure of the springs 42 until the flanging dies 36 and 37 and hub flanging portion 45 are brought into engagement with the blank, as shown in Fig. 10 of the drawing. Further, downward movement of the upper die causes the edge portions of the blank to be bent downwardly against the opposite faces of the annular rib 21 and radial ribs 27 of the lower die and against the outer face 31 of the hub forming portion 30 between the spokes. During the flanging operation, the corrugating spider 37 will have reached its upper limit of movement with respect to the flanging dies 36 and 37 so that in the final portion of the movement of the upper die, the corrugating ribs 40 are forced into the grooves 22 and 28 of the lower die to form the rim and spoke corrugations. The spider is thus pressed to final dished form between the dies which press the continuous strengthening flanges and corrugations into the blank without distorting any portion thereof.

After the stamping operation above described, the central opening 16 is cut in the hub and the spider is then placed in a mold and a body of suitable initially plastic material 18 is molded around the hub spokes and rim of the spider and completely imbeds the same. The projections 4 at the outer edge of the hub portion of the blank form projections on the hub flange 15 which serve as supports for the spider in the mold while the composition body 48 is being applied to the spider, the lugs 4 serving to accurately space the spider with respect to the walls of the mold.

It will be apparent that the present invention provides a method of forming a dished spider which is strengthened throughout with continuous reinforcing flanges and which enables such a spider to be made in a single stamping operation without any distortion due to the flow of metal during the forming operation and that the method of the present invention enables such reinforcing spiders to be manufactured rapidly and at a low cost. In addition, it will be apparent that the forming of dies are of relatively simple and rugged construction capable of long service and of relatively inexpensive construction.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The herein described method of making a flanged metal spider of dished form from a blank having hub, rim and spoke portions, which comprises pressing the hub portion laterally with respect to the plane of the rim portion while holding the rim portion to its original diameter, thereby elongating the spoke portions and dishing the blank, and then simultaneously flanging the rim and spoke portions of the blank.

2. The herein described method of making a flanged metal spider of dished form which comprises cutting from a flat metal plate a blank having a rim portion, a hub portion and spoke portions connecting the hub and rim portions, dishing the flat blank while holding the rim portion to its original diameter, and then forming the hub, rim and spoke portions between flanging dies.

The herein described method of making a flanged metal spider of dished form which comprises cutting from a flat metal plate a blank having a rim portion, a hub portion and spoke portions connecting the hub and rim portions, pressing the hub portion laterally with respect to the plane of the rim portion while holding the rim against inward movement at the points of connection of the spokes therewith to elongate the spokes and dish the blank, and then forming the hub, rim and spoke portions between flanging dies.

4. The herein described method of making a flanged spider which comprises cutting from a flat metal plate a blank having a rim portion, a hub portion and spoke portions connecting the rim and hub portions, forming a series of apertures around the center of the hub portion to leave a central part integrally connected with the outer parts of the hub portion, forming the hub and spoke portions of the blank between flanging dies, and cutting away the metal between said hub apertures to form a central hub opening.

5. The herein described method of manufacturing a flanged metal spider of dished form from a blank having a hub, rim and spoke portions, which comprises pressing the hub portion laterally with respect to the plane of the rim portion while holding the rim portion to its original diameter, thereby elongating the spoke portions and dishing the blank, then flanging the rim and spoke portions of the blank, and simultaneously depressing said rim and spoke portions between the flanges thereof to form strengthening ribs.

6. The herein described method of making a flanged metal spider of dished form from a blank having hub, rim and spoke portions, which comprises pressing the hub portion laterally with respect to the plane of the rim portion while holding the rim portion to its original diameter, thereby elongating the spoke portions and dishing the blank, then simultaneously flanging the rim and spoke portions of the blank, and forming a central hub opening in the hub portion of the blank.

7. The herein described method of making a flanged metal spider of dished form which comprises cutting from a flat metal plate a blank having a rim portion, a hub portion and spoke portions integrally connecting the rim and hub portions, holding said blank at opposite sides of the spokes adjacent their connection with said rim, pressing the hub portion laterally with respect to the plane of the rim portion while said blank is so held, thereby holding said rim to its original diameter, forming the hub, rim and spoke portions between flanging dies, and forming a central hub opening in the hub portion of said blank.

8. The herein described method of making a flanged metal spider of dished form, which comprises cutting from a flat metal plate a blank having a rim portion, a hub portion and spoke portions connecting the rim and hub portions, forming a series of apertures around the center of the hub portion to provide a central part integrally connected with the outer parts of the hub portion, pressing the hub portion laterally with respect to the plane of the rim portion, forming the rim and spoke portions of the blank between flanging dies, and cutting away the metal between said hub apertures to form a central hub opening.

9. The herein described method of making a flanged spider of dished form, which comprises cutting from a flat metal plate a blank having a rim portion, a hub portion and spoke portions connecting said rim and hub portions, forming a series of apertures around the center of the hub portion to provide a central part integrally connected with the outer parts of the hub portion, pressing the hub portion laterally with respect to the plane of the rim portion while holding the rim portion against inward movement at the points of connection of the spokes therewith to elongate the spokes and dish the blank, forming the rim and spoke portions of the blank between flanging dies, and cutting away the metal between said hub apertures to form a central hub opening.

10. The herein described method of making a flanged spider, which comprises cutting from a flat metal plate a blank having a rim portion, a hub portion and spoke portions connecting said rim and hub portions, forming a series of apertures around the center of the hub portion to leave a central part integrally connected with the outer parts of the hub portion, forming the rim and spoke portions with marginal flanges, simultaneously depresssing the rim and spoke portions of the blank to form strengthening ribs intermediate the flanges thereof, and cutting away the metal between said hub apertures to form a central hub opening.

11. The herein described method of making a flanged spider of dished form, which comprises cutting from a flat metal plate a blank having a rim portion, a hub portion and spoke portions connecting the rim and hub portions, forming a series of apertures around the center of the hub portion to provide a central part integrally connected with the outer parts of the hub portion, pressing the hub portion laterally with respect to the plane of the rim portion, forming the rim and spoke portions with marginal flanges, simultaneously depressing the rim and spoke portions of the blank to form strengthening ribs intermediate the flanges thereof, and cutting away the metal between said hub apertures to form a central hub opening.

12. The herein described method of making a flanged spider of dished form, which comprises blanking a flat metal plate having a rim portion, a hub portion and spoke portions connecting said rim and hub portions, pressing the hub portion laterally with respect to the plane of the rim portion while holding the rim portion against inward movement at the points of connection of the spokes therewith to elongate the spokes and dish the blank, then forming the edges of the blank defining the spaces between the spokes with continuous flanges, and forming the hub portion of the blank with a central opening.

13. The herein described method of making a flanged spider of dished form, which comprises forming a blank from a sheet of metal having a rim portion, a hub portion and spoke portions connecting said rim and hub portions, forming a series of apertures around the center of the hub portion to provide a central part integrally connected with the outer parts of a hub portion, pressing the hub portion laterally with respect to the plane of the rim portion to dish the blank while holding said rim portion to its original diameter, forming the rim portion with inner and outer flanges, forming the hub portion with outer flanges, simultaneously forming the spoke portions with side flanges integral with the inner rim flanges and integral with the outer hub flanges to provide a continuous flange defining the spaces between the spoke portions, forming the rim portion with a continuous central depression between the edges thereof, simultaneously forming the spoke portions with longitudinal depressions between the edges thereof merging into said rim depression, and cutting away the metal between said hub apertures to form a central hub opening.

In testimony whereof I affix my signature.

HARRY A. HUSTED.